United States Patent [19]
Huang

[11] Patent Number: 5,252,891
[45] Date of Patent: Oct. 12, 1993

[54] UNINTERRUPTIBLE FLUORESCENT LAMP CIRCUIT AVAILABLE FOR EMERGENCY LIGHTING

[76] Inventor: Ching L. Huang, 4F, 168, San Yuan St., Taipei, Taiwan

[21] Appl. No.: 878,925

[22] Filed: May 6, 1992

[51] Int. Cl.⁵ .............................................. H05B 41/29
[52] U.S. Cl. ...................................... 315/86; 315/172; 315/219; 315/224; 315/307; 315/DIG. 5
[58] Field of Search ................. 315/86, 160, 172, 219, 315/224, 307, DIG. 5

[56] References Cited

U.S. PATENT DOCUMENTS

| | | | |
|---|---|---|---|
| 4,682,078 | 7/1987 | Pascalide | 315/86 |
| 4,686,424 | 8/1987 | Nuckolls et al. | 315/86 |
| 4,977,351 | 12/1990 | Bavaro et al. | 315/86 X |

*Primary Examiner*—David Mis
*Attorney, Agent, or Firm*—Larson and Taylor

[57] ABSTRACT

An uninterruptible fluorescent lamp circuit available for emergency lighting is comprised of an oscillatory boosting circuit which generates a high-frequency, high-voltage power, and a current-limiting circuit which limits current flowing to the fluorescent lamp (the load). Such a fluorescent lamp circuit can provide enough high-voltage power to activate the lamp without the need to use any conventional starter and stabilizer. The current-limiting circuit uses transistors activated at a fixed voltage and a current-limiting resistance which slows the current. A voltage leading power output is generated which prevents the fluorescent lamp from burning out due to a current-leading power output. Since the power source is a high-frequency, high-voltage current, the flicker of the lamp can be effectively reduced. A battery is connectable to provide an uninterruptible power source during an external power failure.

9 Claims, 2 Drawing Sheets

UNINTERRUPTIBLE FLUORESCENT LAMP CIRCUIT AVAILABLE FOR EMERGENCY LIGHTING

BACKGROUND OF THE INVENTION

1. Field of the Invention

The present invention relates to an uninterruptible fluorescent lamp circuit available for emergency lighting, and particularly relates to a fluorescent lamp circuit comprised of a oscillatory boosting circuit and a current-limiting circuit for replacement of conventional starters and stabilizers. The present circuit effectively reduces the flash of fluorescent lamp and reduces the possibility of burning out of the fluorescent lamp due to excessive instantaneous current when activating the lamp.

2. Description of the Prior Art

All kinds of conventional fluorescent lamp circuits include stabilizers and starters. The main functions of stabilizers are:

1) Limiting the current passing through a lamp. The resistance of a fluorescent lamp is very high before discharge, i.e., before the lamp is lighted; then, the resistance abruptly drops after discharge, i.e., after the lamp is lighted. A very large current passes through the lamp after the same is discharged and it might very possibly burn out the lamp if there is not a stabilizer installed. Accordingly, one of the main functions of stabilizers is to avoid an over current or excessive current passing through a fluorescent lamp. For this reason, the stabilizer is also referred to as an impedance coil.

2) Helping the discharge of a fluorescent lamp. A stabilizer is a wound coil, so, it has inductance. In the instant that a starter breaks the circuit, this inductance induces a voltage which is connected in series with a power-supply voltage. The inductance voltage is applied to the two ends of the fluorescent lamp, causing the lamp's voltage at its ends to significantly increase and help the discharge of the lamp.

When a thermal tube in a lamp discharges, the filament should be preheated. Once the discharge begins, the filament keeps discharging without needing subsequent heat. A starter may immediately close the filament circuit in the instant the voltage applies to the fluorescent lamp, and, automatically open the circuit when the filament temperature is increased.

When classified by the types of starters, one of the most commonly used starters is the glow starter. Such starter is made of a small tube in which a connection point of an U-shaped doublelayer metal plate is sealed. When the lamp voltage is increased, a glow discharge occurs inside the lamp. The double-layer metal plate is heated and therefore contacts fixed electrodes and connects the two electrodes of the lamp, causing the same to heat. When the two electrodes are connected, the glow disappears, the double-layer metal plate cools and separates from the fixed electrodes. In the instant the double-layer metal plate separates from the electrodes, the stabilizer generates an induced voltage which together with the power-supply voltage causes the thermal tube of the fluorescent lamp to discharge and thereby, lights the lamp. When the lamp is lighted, the above-mentioned starter immediately stops the glow discharge and no heat is generated between its two electrodes. Thus, a starter is used to shortly conduct current between the two ends of a lamp and to heat the thermal tube of the lamp when the lamp is switched on; then, when the lamp discharges, the starter automatically opens the circuit to increase the lamp's voltage at ends for helping to light the lamp.

Fluorescent lamps with the above-mentioned stabilizers and starters, however, have the following disadvantages in their actual applications:

1. The power source maintains the same frequency and the lamp has an obvious flicker which has an adverse effect on a user's vision.

2. Poor starters can easily blacken the lamp.

3. In the instant the stabilizer effects, the lamp must bear an instantaneous high current pulse which has adverse effect on the usable life of the lamps.

4. The lamp is easily blackened or frequently has intermittent flash when the power-supply voltage is too low or when the lamp is switched on and off too many times within a short period of time. Reversely, when the power-supply voltage is too high, it might cause the lamp to be overheated which will directly affect the usable life of the lamp.

5. Poorly installed stabilizer shall emit noise.

It can be seen from the above that conventional fluorescent lamp circuit design is apparently not an ideal one.

SUMMARY OF THE INVENTION

It is a primary object of the present invention to provide a fluorescent lamp circuit which may avoid the disadvantages existed in the conventional circuit designs by using an oscillatory boosting circuit to generate high-frequency and high-voltage current to light the lamp without needing the on and off of a starter, and a current-limit circuit to effectively limit the current flows to the load (the lamp) without mounting any stabilizer that may avoid the lamp from burning out and completely eliminate the high current pulse in the instant of lighting the lamp.

Another object of the present invention is to provide the above-mention circuit with a power-interruption-detection-and-switchover circuit or PIDS circuit set up at where the power is input while a battery is connected therewith. When external power source is input in ordinary state, the battery is charged; when external power source disappears, i.e., in an occasion of power failure, the battery will discharge to maintain power supply to the lamp for at least a short period of time. By this way, the intermittent flash of lamp caused by power failure can be reduced which is helpful to the longer usable life of the lamp.

BRIEF DESCRIPTION OF THE DRAWINGS

The present invention can be better understood by referring to the following detailed description of the preferred embodiment and the accompanying drawings wherein.

DETAILED DESCRIPTION OF PREFERRED EMBODIMENTS

Figure 1:
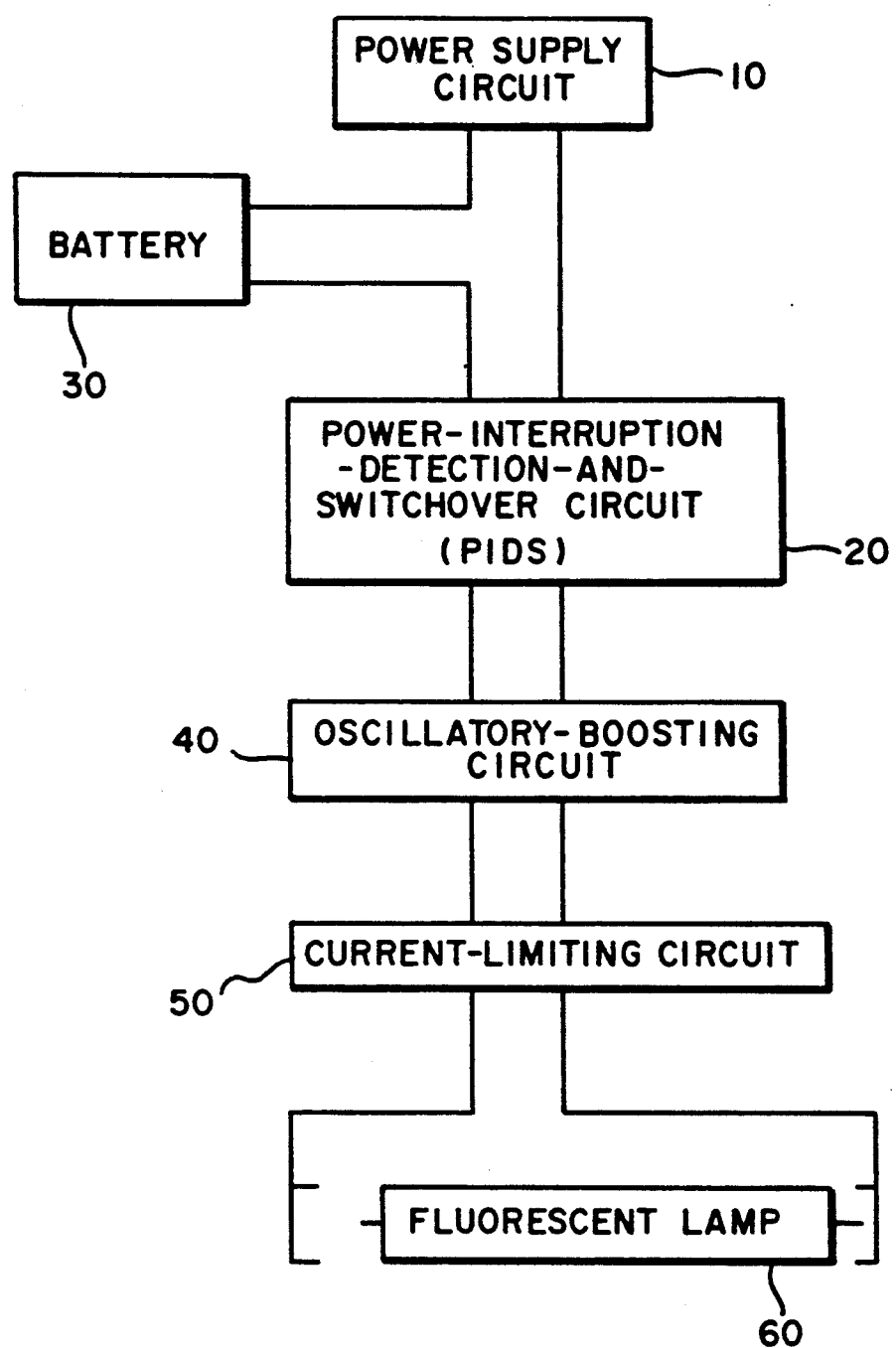
FIG. 1 is a schematic block diagram of a circuit according to the present invention.
Figure 2:
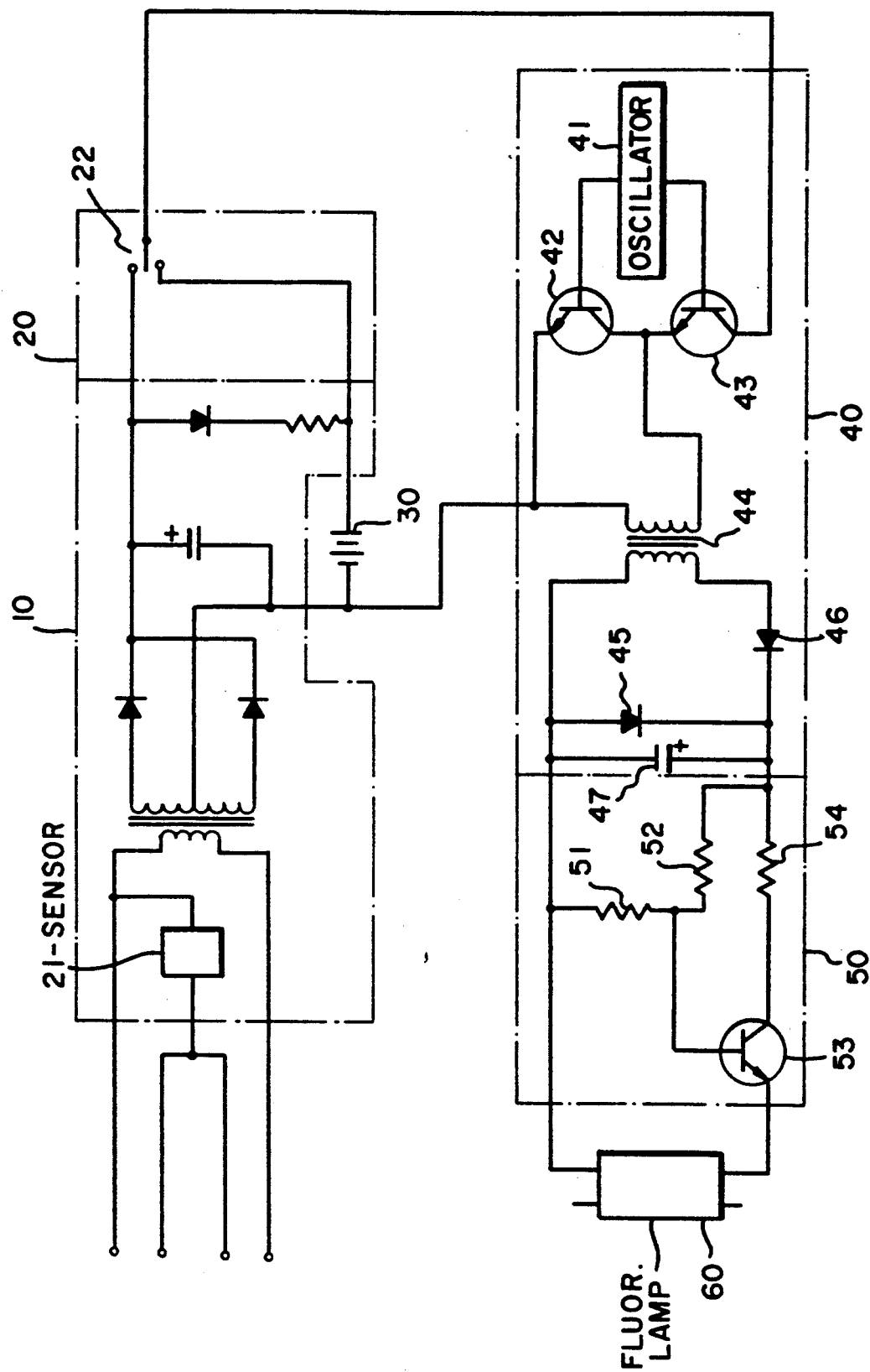
FIG. 2 is an electrical schematic diagram of the circuit according to the present invention.

Please refer to FIG. 1, the present invention mainly includes a power supply circuit 10, a power-interruption-detection-andswitchover (PIDS) circuit 20, a battery 30, an oscillating boosting circuit 40, a current-limiting circuit 50, and a fluorescent lamp 60. The PIDS circuit 20 as shown in FIG. 2, mainly consists of a sensor 21 connected close to an end of the circuit from where power is inputted, and an electromagnetic switch 22 controlled by the sensor 21. The electromagnetic switch 22 may switch over to connect an external power source of a battery 30, depending on its excitement status. The oscillatory boosting circuit 40 is located after electromagnetic switch 22 and consists of a high frequency oscillatory circuit comprised of an oscillator 41 and two transistors 42, 43, and a booster 44. This oscillatory boosting circuit 40 can transform current passing through it into a power source with high frequency and high voltage for lighting a fluorescent lamp 60. After connected booster 44, are two diodes 45, 46 an a capacitor 47, connected in parallel, to form a voltage-doubler circuit which boosts the voltage for the second time and maintain a stable high voltage. The current-limiting circuit 50, located after oscillatory boosting circuit 40, uses two resistances 51, 52 to activate at a fixed voltage a transistor 53. Circuit 50 further uses a current-limiting resistance 54 to interact with transistor 53, causing the latter to deviate that will slow the activation of current and thereby causes a voltage-leading power output which prevents the fluorescent lamp 60 from being burned out by a high current pulse.

With this circuit design, when an external power source is used, the PIDS circuit 20 is excited, causing the electromagnetic switch 22 to connect the external power source and the load while allowing the battery 30 to be charged; and, when the external power source disappears (e.g., when a power failure occurs), the electromagnetic switch 22 de-excites and switches over to connect battery 30 to the load. At this time, the load is powered by the battery 30 for a certain period of time. The power supplied is transformed by the oscillating boosting circuit 40 into a high-frequency, high-voltage oscillatory power which provides a high voltage that is just enough to light fluorescent lamp 60. The high-frequency oscillation enables the fluorescent lamp 60 to light more stably with less flash. The current-limiting circuit 50 provides a voltage-leading power output which prevents the generation of high-voltage current pulse and thereby enhances the stability of the voltage.

The present invention, as described above, provides a fluorescent lamp circuit which does not need conventional stabilizers and starters an can effectively eliminate the disadvantages found on a fluorescent lamp that are caused by these stabilizers or starters. The present invention can effectively give fluorescent lamps not only more stable lighting effect but also longer usable life.

What is claimed is:

1. An uninterruptible fluorescent lamp circuit available for emergency lighting comprising in sequence
   a power supply circuit and a battery connected in parallel to each other,
   a power - interruption - detection - and - switchover (PIDS) circuit,
   an oscillatory boosting circuit,
   a current-limiting circuit, and
   a fluorescent lamp;
   said oscillatory boosting circuit transforming the input power to it into a high-frequency, high-voltage power which passes through said current-limiting circuit before being outputted to energize said fluorescent lamp.

2. An uninterruptible fluorescent lamp circuit for emergency lighting as claimed in claim 1, wherein said power-interruption- detection-and switchover circuit is comprised of a sensor mounted nearby an external power source input and
   and an electromagnetic switch controlled by said sensor, said electromagnetic switch being able to connect said fluorescent lamp (load) to said external power source or to connect said fluorescent lamp (load) to said battery.

3. An uninterruptible fluorescent lamp circuit for emergency lighting as claimed in claim 1, wherein said oscillatory boosting circuit is comprised of a high-frequency oscillatory circuit that includes an oscillator and two transistors connected together, a booster connected to the output of said high-frequency oscillatory circuit, and a voltage-doubler circuit comprised of two diodes and a capacitor connected in parallel.

4. An uninterruptible fluorescent lamp circuit for emergency lighting as claimed in claim 1, wherein said current-limiting circuit is comprised of two resistors, a transistor which is activated by said two resistors at a fixed voltage, and a current-limiting resistance connected to a cathode of said transistor.

5. An uninterruptible fluorescent lamp circuit for emergency lighting as claimed in claim 4, wherein said powerinterruption-detection-and switchover circuit is comprised of a sensor mounted nearby an external power source input and
   and an electromagnetic switch controlled by said sensor, said electromagnetic switch being able to connect said fluorescent lamp (load) to said external power source or to connect said fluorescent lamp (load) to said battery.

6. An uninterruptible fluorescent lamp circuit for emergency lighting as claimed in claim 5, wherein said oscillatory boosting circuit is comprised of a high-frequency oscillatory circuit that includes an oscillator and two transistors connected together, a booster connected to the output of said high-frequency oscillatory circuit, and a voltage-doubler circuit comprised of two diodes and a capacitor connected in parallel.

7. An uninterruptible fluorescent lamp circuit for emergency lighting as claimed in claim 4, wherein said oscillatory boosting circuit is comprised of a high-frequency oscillatory circuit that includes an oscillator and two transistors connected together, a booster connected to the output of said high-frequency oscillatory circuit, and a voltage-doubler circuit comprised of two diodes and a capacitor connected in parallel.

8. An uninterruptible fluorescent lamp circuit for emergency lighting as claimed in claim 2, wherein said oscillatory boosting circuit is comprised of a high-frequency oscillatory circuit that includes an oscillator and two transistors connected together, a booster connected to the output of said high-frequency oscillatory circuit, and a voltage-doubler circuit comprised of two diodes and a capacitor connected in parallel.

9. An uninterruptible fluorescent lamp circuit for emergency lighting as claimed in claim 2, wherein said current-limiting circuit is comprised of two resistors, a transistor which is activated by said two resistors at a fixed voltage, and a current-limiting resistance connected to a cathode of said transistor.

* * * * *